US011349377B2

(12) United States Patent
Rong

(10) Patent No.: US 11,349,377 B2
(45) Date of Patent: May 31, 2022

(54) ELECTRIC MACHINE FOR A HYBRID OR ELECTRIC VEHICLE

(71) Applicant: FORD GLOBAL TECHNOLOGIES, LLC, Dearborn, MI (US)

(72) Inventor: Chuanbing Rong, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 16/773,132

(22) Filed: Jan. 27, 2020

(65) Prior Publication Data
US 2021/0234442 A1    Jul. 29, 2021

(51) Int. Cl.
| H02K 15/00 | (2006.01) |
| H02K 15/03 | (2006.01) |
| H02K 1/276 | (2022.01) |
| H01F 41/02 | (2006.01) |
| B32B 15/01 | (2006.01) |
| H01F 1/14 | (2006.01) |
| H02K 1/28 | (2006.01) |

(52) U.S. Cl.
CPC ............ *H02K 15/03* (2013.01); *B32B 15/011* (2013.01); *H01F 1/14* (2013.01); *H01F 41/0253* (2013.01); *H02K 1/276* (2013.01); *H02K 1/28* (2013.01); *Y10T 29/53143* (2015.01)

(58) Field of Classification Search
CPC .... H01F 41/0266; H01F 1/14; H01F 41/0253; H01F 7/021; H02K 15/03; H02K 1/02; H02K 1/27; H02K 1/276; H02K 1/28; Y10T 29/49075; Y10T 29/49826; Y10T 29/53143
USPC ......... 29/732, 596, 598, 602.1, 603.01, 605, 29/729, 738, 825, 876
See application file for complete search history.

(56) References Cited

U.S. PATENT DOCUMENTS

| 6,078,237 A | * | 6/2000 | Nomura ................ H01F 1/0571 335/302 |
| 6,741,002 B2 | * | 5/2004 | Nishiyama ............ B60L 3/0061 310/156.53 |
| 9,881,722 B2 | * | 1/2018 | Nishio ................ H01F 41/0266 |
| 2014/0028139 A1 | * | 1/2014 | Hamer ................ H02K 1/2766 310/156.11 |
| 2017/0330684 A1 | | 11/2017 | Balogh et al. |
| 2019/0131065 A1 | | 5/2019 | Jia et al. |

* cited by examiner

*Primary Examiner* — Thiem D Phan
(74) *Attorney, Agent, or Firm* — David B Kelley; Brooks Kushman P.C.

(57) ABSTRACT

An electric machine that is configured to propel a vehicle includes a stator and a rotor. The stator has windings that are configured to generate magnetic fields. The rotor has a plurality of magnetic blocks that interacts with the magnetic fields to produce rotational motion. Each of the plurality of magnetic blocks is segmented into a plurality of permanent magnets. Adjacent permanent magnets within each magnetic block are separated from and secured to each other via an intermediate electrically insulating material. The intermediate electrically insulating material is comprised of magnetic particles that are suspended in an adhesive matrix.

15 Claims, 4 Drawing Sheets

ELECTRIC MACHINE FOR A HYBRID OR ELECTRIC VEHICLE

TECHNICAL FIELD

The present disclosure relates to hybrid/electric vehicles and electric machines that are configured to propel hybrid/electric vehicles.

BACKGROUND

Hybrid/electric vehicles may include an electric machine that is configured to propel the vehicle.

SUMMARY

A vehicle includes an electric machine. The electric machine is configured to propel the vehicle. The electric machine includes a stator and a rotor. The stator has windings that are configured to generate magnetic fields. The rotor has a plurality of magnets that interacts with the magnetic fields to produce rotational motion. Each of the plurality of magnets includes a plurality of permanent magnet segments. Adjacent permanent magnet segments within each of the plurality of magnets are separated from and secured to each other via an intermediate electrically insulating material to reduce eddy current loses within the magnets. The intermediate electrically insulating material is comprised of soft magnetic particles that are suspended in an adhesive matrix to increase the remanence and the flux density of each of the plurality of magnets.

An electric machine that is configured to propel a vehicle includes a stator and a rotor. The stator has windings that are configured to generate magnetic fields. The rotor has a plurality of magnets that interacts with the magnetic fields to produce rotational motion. Each of the plurality of magnets form interleaved layers of permanent magnets and an intermediate electrically insulating material to reduce eddy current loses within the magnets. The intermediate electrically insulating material is comprised of soft magnetic particles that are suspended in an adhesive matrix to increase the remanence and the flux density of each of the magnetic blocks.

An electric machine that is configured to propel a vehicle includes a stator and a rotor. The stator has windings that are configured to generate magnetic fields. The rotor has a plurality of magnetic blocks that interacts with the magnetic fields to produce rotational motion. Each of the plurality of magnetic blocks is segmented into a plurality of permanent magnets. Adjacent permanent magnets within each magnetic block are separated from and secured to each other via an intermediate electrically insulating material. The intermediate electrically insulating material is comprised of magnetic particles that are suspended in an adhesive matrix.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
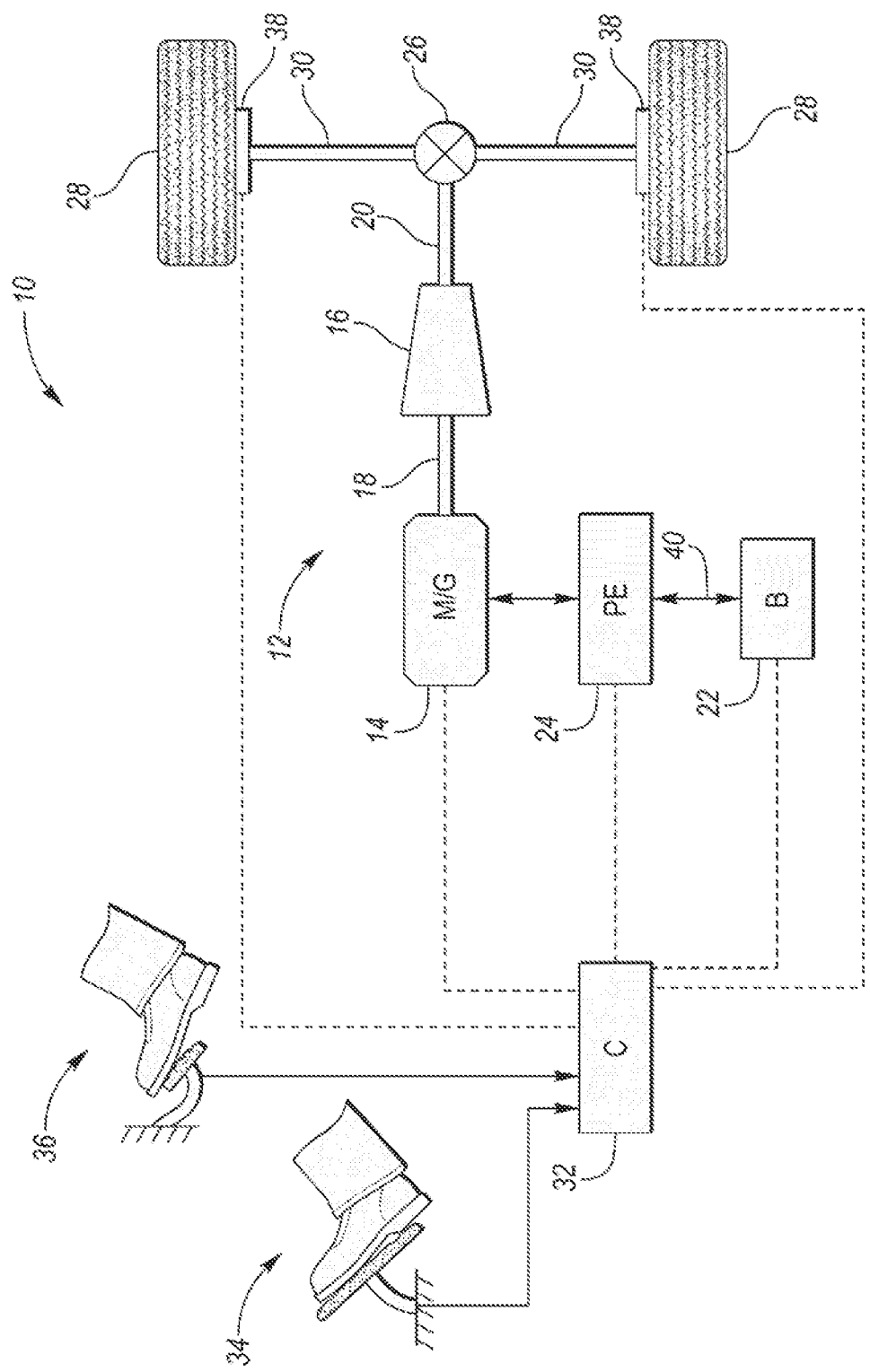
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 to propel the vehicle 10. The M/G 14 drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 is configured to draw electrical power from the battery 22 to propel the vehicle 10 in response to an acceleration request, which may be processed by a controller. The M/G 14 is also configured to deliver electrical power to the battery 22 to recharge the battery 22, which may occur during regenerative braking or during periods where another power source, such as an engine, is powering the M/G 14. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (LI/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (JGN), ambient air temperature (e.g., ambient air temperature sensor), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The MG 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

It should be understood that the vehicle configuration described herein is merely exemplary and is not intended to be limited. Other electric, or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs) or any other vehicle configuration known to a person of ordinary skill in the art.

Permanent magnet electric machines or motors may be used in hybrid or electric vehicles. However, due to the high conductivity of sintered permanent magnets and the slot/tooth harmonics, eddy current losses may be generated within the permanent magnets. The eddy current losses may increase the temperature of the permanent magnets, which may reduce the performance of the permanent magnets and lead to a corresponding reduction in efficiency of the electric machines. Segmented permanent magnets that include an electrical insulating material may be utilized as opposed to single solid permanent magnets to reduce the eddy current losses. The electrical insulating material may also function as a bonding material between the segments of the permanent magnets. The bonding materials may be an epoxy, a glue, a thermoset, a thermoplastic, etc. However, since the bonding material is also an electrical insulator, the performance of the segmented permanent magnets may be reduced due to a lower flux density and a lower remanence relative to single solid permanent magnets, that results from including the bonding material. This disclosure includes utilizing bonding materials that are made from a mixture of magnetic powders and an epoxy, a glue, a thermoset, a thermoplastic, etc. The epoxy, glue, thermoset, thermoplastic, etc. works as insulating media to reduce the eddy current loss in the segmented permanent magnets while the magnetic powders, which may be comprised of so magnetic materials, improve the performance of the segmented permanent magnets by increasing the flux density and remanence of the segmented permanent magnets.

Materials which retain their magnetism and are difficult to demagnetize are called hard magnetic materials or permanent magnets. Hard magnetic materials retain their magnetism even after the removal of an applied magnetic field. Soft magnetic materials are easy to magnetize and demagnetize. Soft magnets (i.e., magnets that are made from soft magnetic materials) depend on the strength of a magnetic field that is needed to align the magnetic domains of the particles of the soft magnetic material. Soft magnetic materials may not retain their magnetism after the removal of an applied magnetic field and are used for making temporary magnets.

Figure 2:
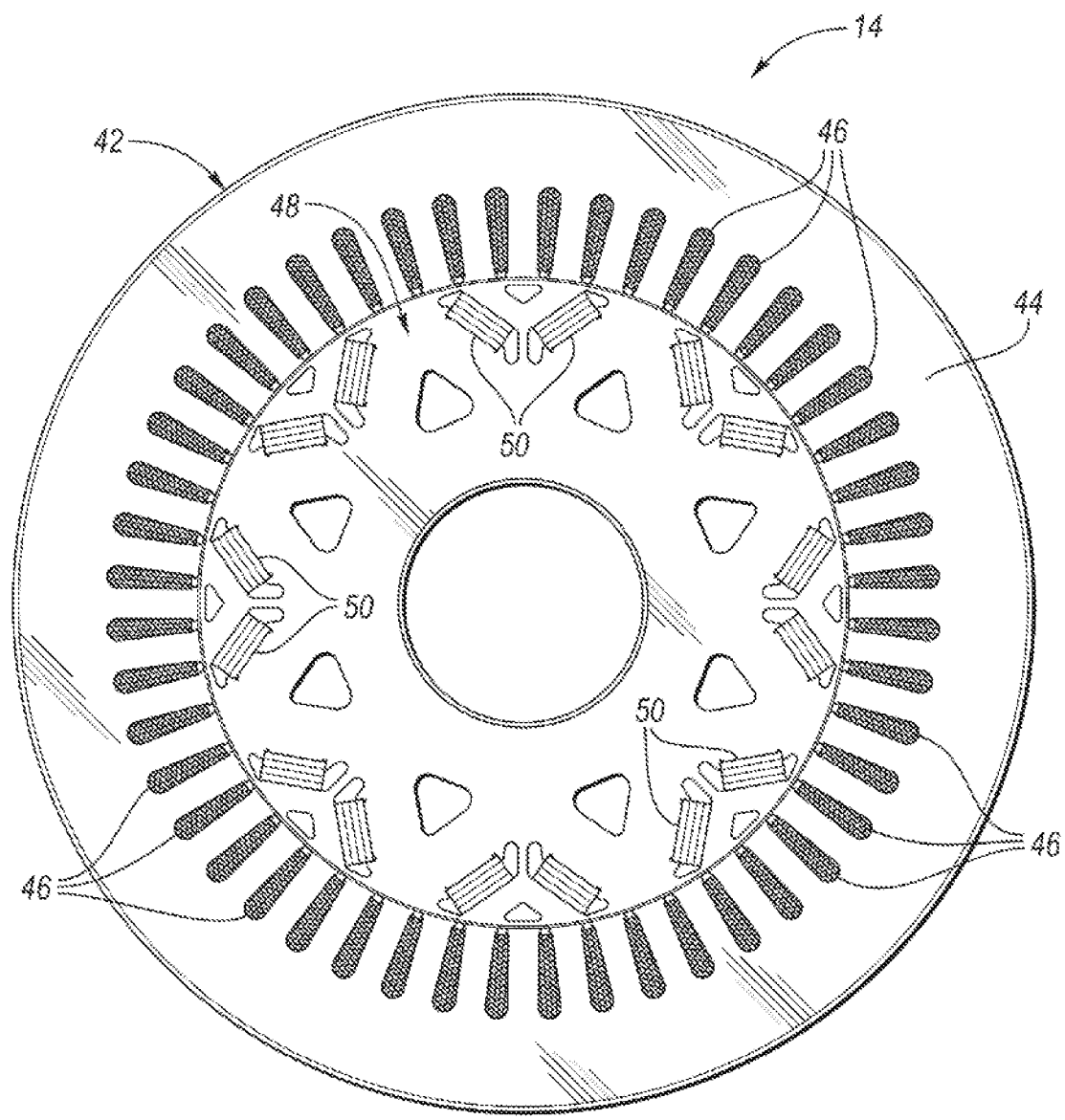
FIG. 2 is a front view of an electric machine including the rotor and stator of the electric machine.
Figure 3:
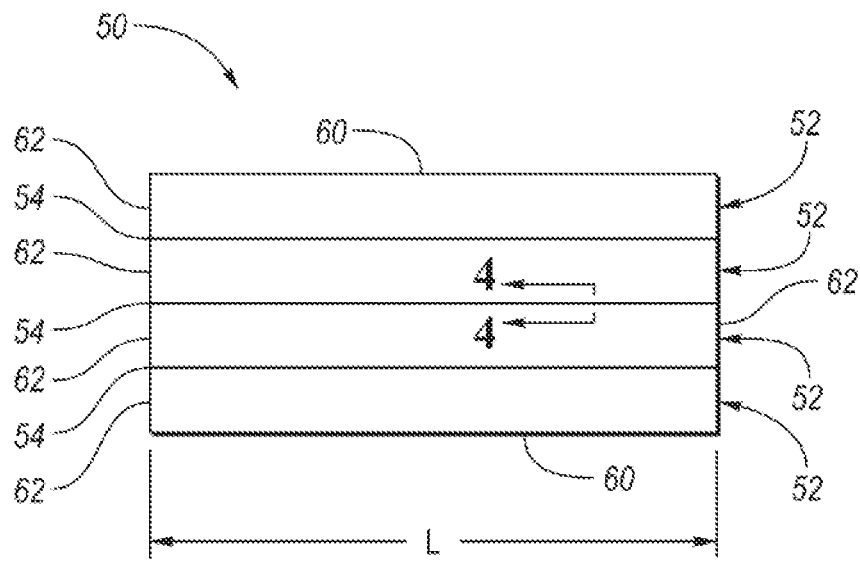
FIG. 3 illustrates one of a plurality of magnets of the rotor of the electric machine that interacts with a magnetic field produced by the stator of the electric machine to produce rotational motion.
Figure 4:
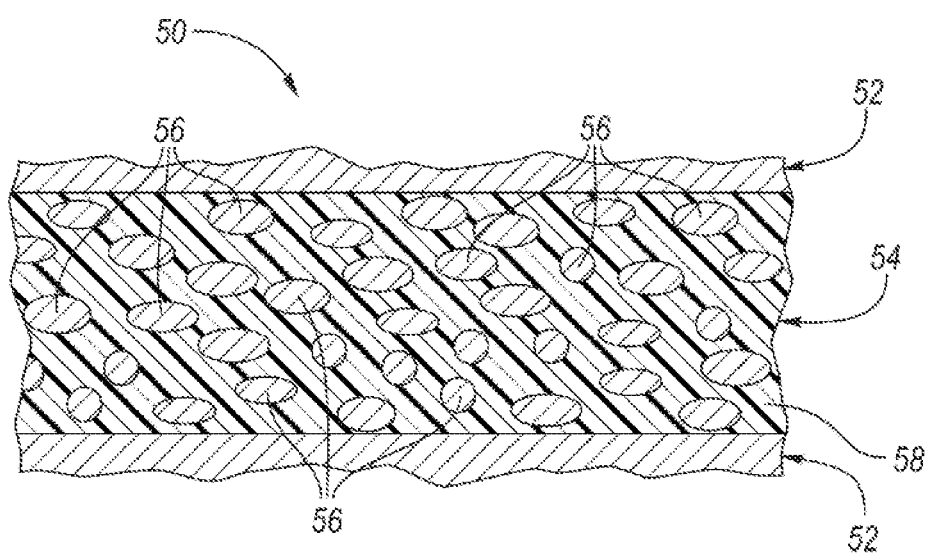
FIG. 4 is a cross-sectional magnified view taken along line 4-4 in FIG. 3.

Referring to FIGS. 2-4, the M/G 14 including various subcomponents are illustrated. The MG 14 includes a stator 42. The stator 42 has a core 44 and windings 46 that are configured to generate magnetic fields. The windings 46 are show as cross-sections in FIG. 2 for illustrative purposes. The M/G 14 includes a rotor 48. The rotor 48 has a plurality of magnets or magnetic blocks 50 that interacts with the magnetic fields produced by the winding 46 to produce rotational motion of the rotor 48. Each of the plurality of magnetic blocks 50 includes a plurality of permanent magnet segments 52. Stated in other terms, each of the plurality of the magnetic blocks 50 may be segmented into a plurality of permanent magnets 52. Adjacent permanent magnets or permanent magnet segments 52 within each of the plurality of magnetic blocks 50 are separated from and secured to each other via an intermediate electrically insulating material 54. The intermediate electrically insulating material 54 is a composite material that is comprised of soft magnetic particles 56 that are suspended in an adhesive matrix 58. The electrically insulating properties of the adhesive matrix reduces eddy current loses within the magnetic blocks 50. The soft magnetic particles 56 increase the remanence and the flux density of the magnetic blocks 50. In the alternative, it may be stated that the plurality of magnets or magnetic blocks 50 form interleaved layers of the permanent magnets or permanent magnet segments 52 and the intermediate electrically insulating material 54.

Each of the permanent magnet segments 52 may be rectangular in shape having long sides 60 and short sides 62. The long sides 62 of the permanent magnet segments 52 define long sides or the lengths, L, of the long side of each of the plurality of magnets or magnetic blocks 50. The long sides 60 of adjacent permanent magnet segments 52 within each of the plurality of magnets or magnetic blocks 50 are separated from and secured to each other via the intermediate electrically insulating material 54. The intermediate electrically insulating material 54 may extend along the entire lengths, L, of the plurality of magnets or magnetic blocks 50. It should be noted that there is no intermediate electrically insulating material 54 disposed along the outer perimeter of each of the plurality of magnets or magnetic blocks 50, including the long sides 60 of the permanent magnet segments 52 that are not adjacent to another of the permanent magnet segments 52.

The plurality of permanent magnet segments 52 may be comprised of a Neodymium-Iron-Boron (Nd—Fe—B) alloy, a Samarium-Cobalt (Sm—Co) alloy, or any other material having hard or permanent magnetic properties. The soft magnetic particles 56 may be comprised of Iron (Fe), an Iron-Cobalt (Fe—Co) alloy, or any other material having soft magnetic properties. The adhesive matrix 58 may be comprised of an epoxy, a glue, a thermoset, a thermoplastic, or any other material having electrical insulating and binding agent properties.

In alternative embodiments, the particles 56 that are suspended in the adhesive matrix 58 may be permanent magnetic particles or semi-hard magnetic particles. If the particles 56 are permanent magnetic particles, the particles 56 may be comprised of a Neodymium-Iron-Boron (Nd—Fe—B) alloy (e.g., melt-spun Nd—Fe—B ribbons), a Samarium-Cobalt (Sm—Co) alloy, or any other material having hard or permanent magnetic properties. If the particles 56 are semi-hard magnetic particles, the particles 56 may be comprised of ferrite, a Manganese-Bismuth alloy (Mn—Bi), an Iron-Nitrogen ally (Fe—N), or any other material having semi-hard magnetic properties.

Figure 5:
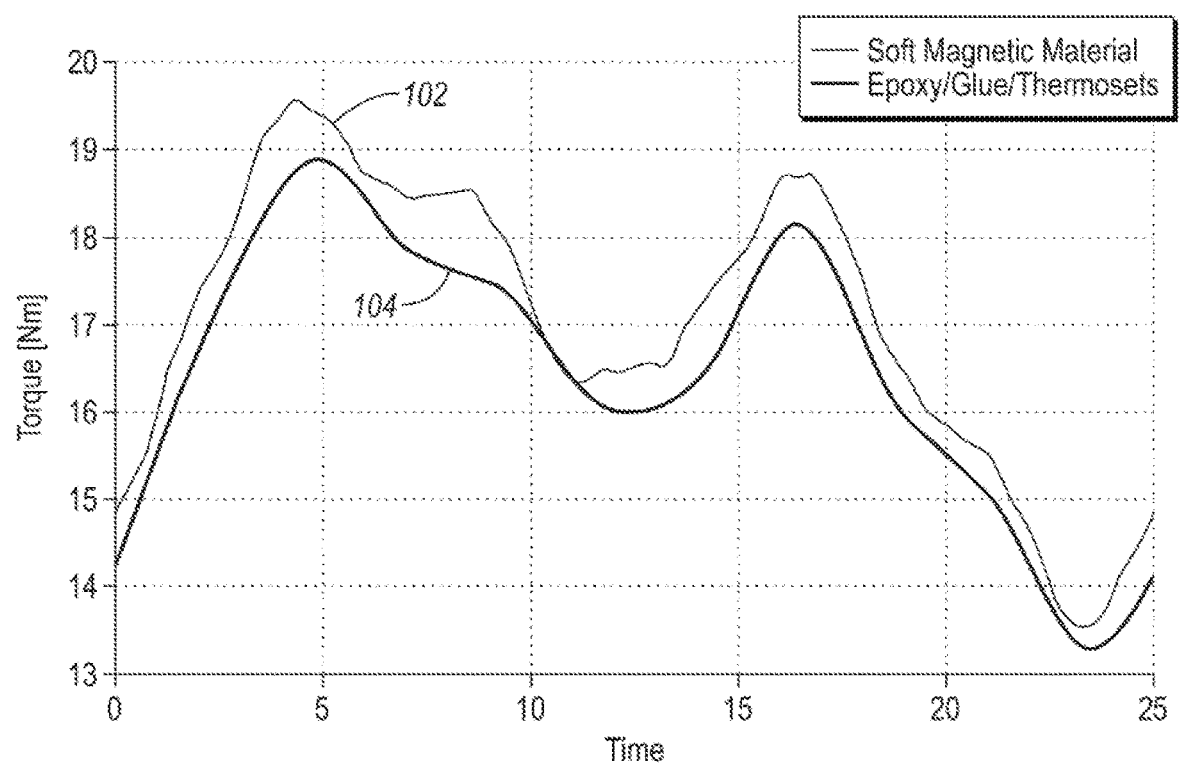
FIGS. 5 and 6 illustrate an increase in the torque output profile of an electric machine when the rotor of the electric machine utilizes the magnetic blocks described herein.
Figure 6:
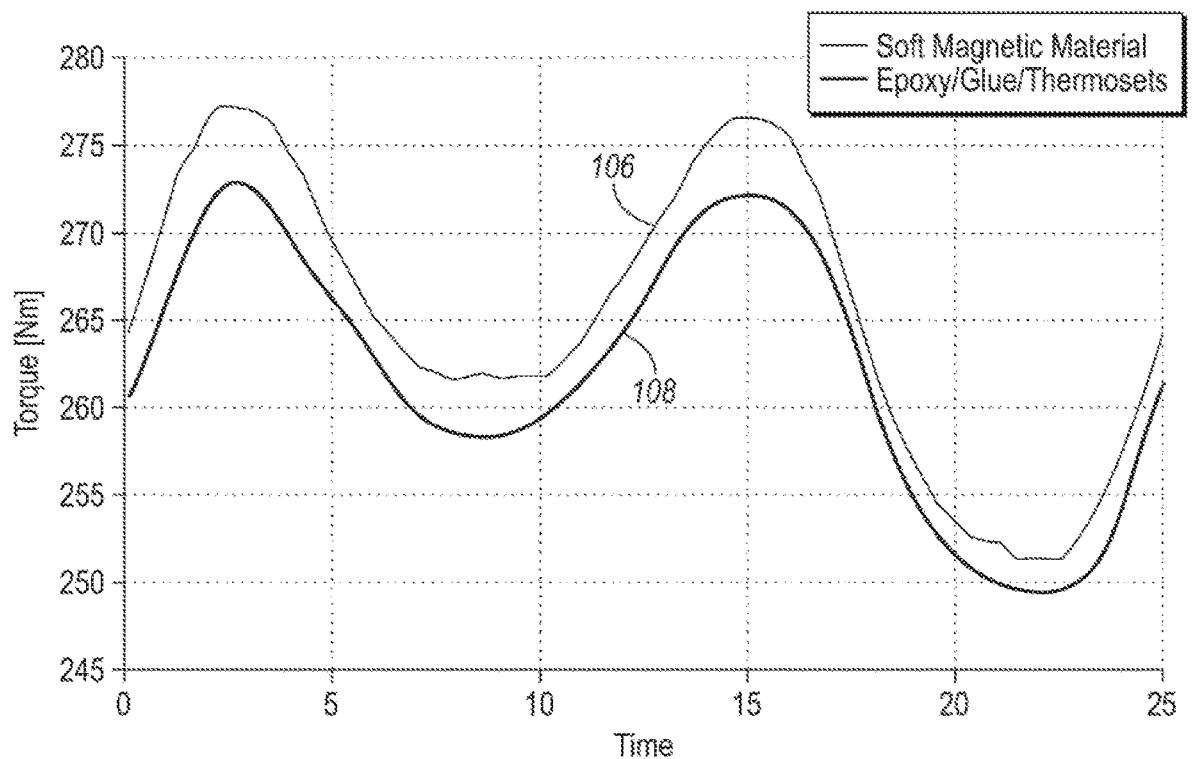

Referring to FIGS. 5 and 6, an increase in the torque output profile of an electric machine (e.g., M/G 14) when the rotor of the electric machine utilizes the magnetic blocks 50 described herein is illustrated. FIG. 5 illustrates a low torque output profile of the electric machine and FIG. 6 illustrates a high torque output profile of the electric machine. Line 102 represents a low torque output profile of the electric machine when the permanent magnet segments 52 of the plurality of magnets or magnetic blocks 50 are bound together with the electrically insulating material 54 that comprises the soft magnetic particles 56 that are suspended in the adhesive matrix 58. Line 104 represents a low torque output profile of the electric machine when the permanent magnet segments 52 of the plurality of magnets or magnetic blocks 50 are bound together with an electrically insulating material that only comprises an adhesive matrix. Line 106 represents a high torque output profile of the electric machine when the permanent magnet segments 52 of the plurality of magnets or magnetic blocks 50 are bound together with the electrically insulating material 54 that comprises the soft magnetic particles 56 that are suspended in the adhesive matrix 58. Line 108 represents a high torque output profile of the electric machine when the permanent magnet segments 52 of the plurality of magnets or magnetic blocks 50 are bound together with an electrically insulating material that only comprises an adhesive matrix. The increase in the torque output profiles demonstrates that the efficiency of the electric machine is increased when the plurality of magnets or magnetic blocks 50 are bound together with the electrically insulating material 54 that comprises both the soft magnetic particles 56 and the adhesive matrix 58 relative to an insulating material that only comprises an adhesive matrix.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an electric machine configured to propel the vehicle, the electric machine including,
a stator having windings that are configured to generate magnetic fields, and
a rotor (i) defining a plurality of elongated orifices having a length and a width that is shorter than the length and (ii) having a plurality of magnets that interacts with the magnetic fields to produce rotational motion, wherein each of the plurality of magnets (i) is disposed within one of the elongated orifices and (ii) includes a plurality of permanent magnet segments stacked in a direction along the width of a respective elongated orifice and in a direction that extends radially outward from a center of the rotor, adjacent permanent magnet segments within each of the plurality of magnets are separated from and secured to each other via an intermediate electrically insulating material to reduce eddy current loses within the magnets, the intermediate electrically insulating material is comprised of soft magnetic particles that are suspended in an adhesive matrix to increase the remanence and the flux density of each of the plurality of magnets.

2. The vehicle of claim 1, wherein each of the permanent magnet segments are rectangular in shape having long sides and short sides, and wherein the long sides of the permanent magnet segments define long sides of each of the plurality of magnets.

3. The vehicle of claim 2, wherein the long sides of adjacent permanent magnet segments within each of the plurality of magnets are separated from and secured to each other via the intermediate electrically insulating material.

4. The vehicle of claim 1, wherein the permanent magnet segments are comprised of a Neodymium-Iron-Boron alloy.

5. The vehicle of claim 1, wherein the permanent magnet segments are comprised of a Samarium-Cobalt alloy.

6. The vehicle of claim 1, wherein the soft magnetic material particles are comprised of Iron.

7. The vehicle of claim 1, wherein the soft magnetic material particles are comprised of an Iron-Cobalt alloy.

8. The vehicle of claim 1, wherein the adhesive matrix is a thermoset material.

9. The vehicle of claim 1, wherein the adhesive matrix is a thermoplastic material.

10. The vehicle of claim 1, wherein the each of the permanent magnet segments of each magnet are geometrically identical.

11. The vehicle of claim 1, wherein the permanent magnet segments are stacked at an angle relative to the center of the rotor.

12. An electric machine configured to propel a vehicle comprising:
    a stator having windings that are configured to generate magnetic fields; and
    a rotor (i) defining a plurality of elongated orifices having a length and a width that is shorter than the length and (ii) having a plurality of magnetic blocks that interacts with the magnetic fields to produce rotational motion, wherein each of the plurality of magnetic blocks (i) is disposed within one of the elongated orifices and (ii) is segmented into a plurality of permanent magnets stacked in a direction along the width of a respective elongated orifice and in a direction that extends radially outward from a center of the rotor, adjacent permanent magnets within each magnetic block are separated from and secured to each other via an intermediate electrically insulating material, the intermediate electrically insulating material is comprised of magnetic particles that are suspended in an adhesive matrix.

13. The electric machine of claim 12, wherein each of the plurality of permanent magnets are rectangular in shape having long sides and short sides, wherein the long sides of the plurality of permanent magnets define long sides of each of the plurality of magnetic blocks, and wherein the long sides of adjacent permanent magnets within each of the plurality of permanent magnets are separated from and secured to each other via the intermediate electrically insulating material.

14. The electric machine of claim 12, wherein the each of the permanent magnets of each magnetic block are geometrically identical.

15. The vehicle of claim 12, wherein the permanent magnets are stacked at an angle relative to the center of the rotor.

* * * * *